E. E. ELLMANN, F. A. KELL AND L. L. ZACHARIAS.
NUT LOCK.
APPLICATION FILED NOV. 13, 1919.
1,351,235.
Patented Aug. 31, 1920.
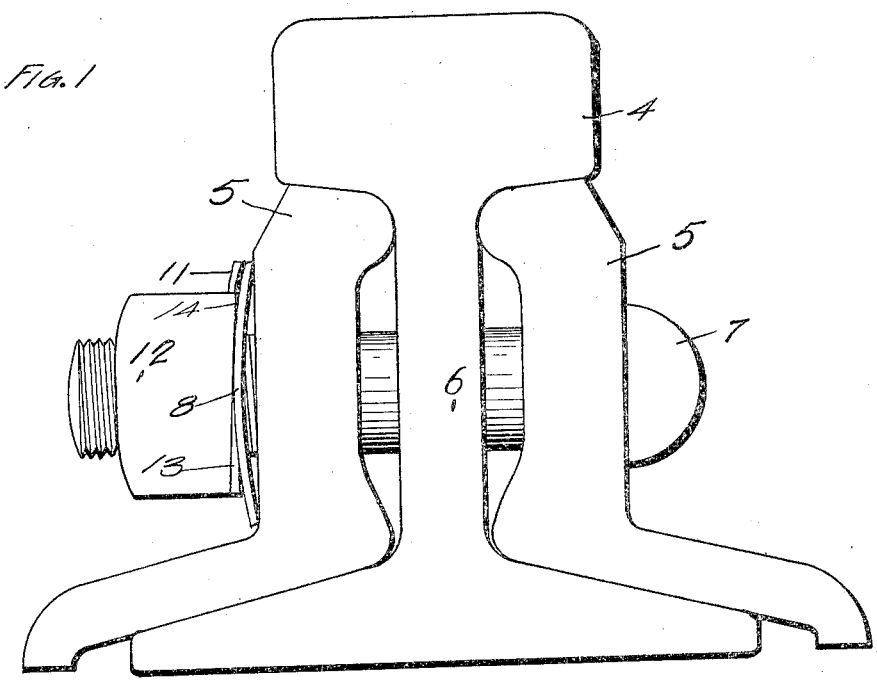
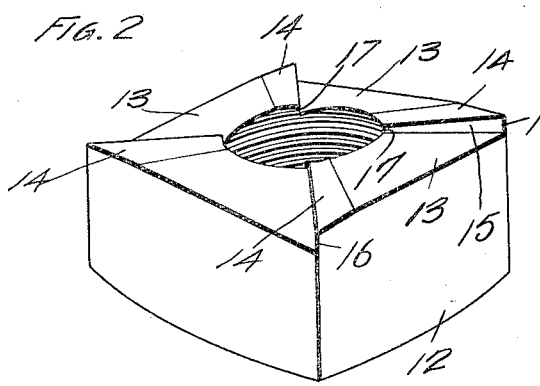
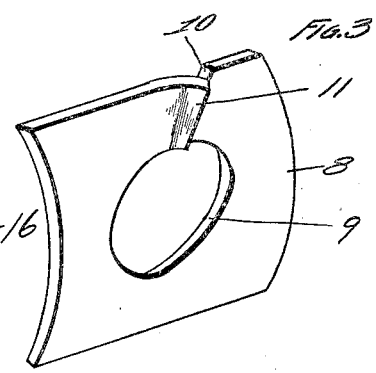
Inventors
Ernest E. Ellmann
Frank A. Kell
Leonard L. Zacharias
By Edward E. Longan
ATTY.

UNITED STATES PATENT OFFICE.

ERNEST E. ELLMANN, FRANK A. KELL, AND LEONARD L. ZACHARIAS, OF ST. LOUIS, MISSOURI; SAID KELL AND SAID ZACHARIAS ASSIGNORS TO SAID ELLMANN.

NUT-LOCK.

1,351,235.    Specification of Letters Patent.    Patented Aug. 31, 1920.

Application filed November 13, 1919. Serial No. 337,700.

*To all whom it may concern:*

Be it known that we, ERNEST E. ELLMANN, FRANK A. KELL, and LEONARD L. ZACHARIAS, citizens of the United States, and residents of the city of St. Louis and State of Missouri, have invented certain new and useful Improvements in Nut-Locks, of which the following is a specification containing a full, clear, and exact description, reference being had to the accompanying drawings, forming a part thereof.

Our invention relates to an improvement in nut locks, and has for its primary object a nut lock designed principally for track work, which can be attached without the necessity of using new fish plates or bolts.

A further object is to construct a nut lock having a concavo-convex washer with a tongue struck up from the convex side and a nut having a plurality of shoulders which are adapted to engage the struck up portion of the washer.

In the drawings:

Figure 1 is an end view of a rail having fish plates on either side with a bolt extending therethrough and our nut lock in position, Fig. 2 is a perspective view of the nut made use of, and Fig. 3 a perspective view of the washer.

Referring to the drawings, 4 indicates a railroad rail, and 5 the fish plates, these being of ordinary construction will not be described in detail. Through the fish plates and the web 6 of the rail the bolt 7 is passed. Over the threaded end of the bolt we then place a concavo-convex washer 8 which is formed of spring steel. This washer is provided with the opening 9, and extending from its opening to one of the edges is a slit 10. A portion of the washer 8 adjoining the slit 10 is bent upwardly from the convex face so as to form a shoulder 11, this being for the purpose of engaging the shoulders formed on the nut. The object of making the washer concavo-convex is that when the nut is tightened the washer will be flattened and the spring in the washer having a tendency to force the shoulder 11 against the recess in the nut.

This washer is made rectangular in form so that the same cannot turn after being applied to the work. The nut 12 is provided on its contacting face with a series of recesses 13 and flat portions 14, the flat portion 14 being parallel to the outer face of the nut and the recesses 13 at an angle thereto, so as to form diagonal shoulders 15. These diagonal shoulders have their outer edges 16 longer than the inner edges 17, or in other words, the face of the recess 13 tapers in two directions, that is, from the center of the nut to its outer edge, and from the flat portion 14 to the shoulder 15. This is made necessary by the curvature imparted to the washer, so that the shoulder 11 will bear against the shoulder 15 throughout its entire length.

The operation of our device is as follows: After the bolt 7 has been inserted and the washer 8 placed in position, the nut 12 is screwed up, and after the nut 12 comes in contact with the washer 8, the shoulder 11 will spring into the recess 13 at each quarter revolution, then gradually ride up the inclined face thereof until it passes over the next shoulder, when it again drops into the recess. In this way the nut is held against retrograde movement while the flat portions 14 give a firm bearing against the washer. This would not be the case were the recesses 13 tapered from one shoulder directly to the other, as then only the edges of the shoulder would have any bearing against the washer.

It is understood of course that these washers are made of different sizes according to the different sized rails used, so that there will be no possibility of the washer turning when the nut is tightened.

Having fully described our invention, what we claim is:

1. A nut lock comprising in combination with a screw threaded bolt, a rectangular concavo-convex washer formed of spring material, an opening formed in the center of the washer for receiving the bolt, a projecting tongue formed on said washer, said tongue extending from the opening to one edge of the washer, and a nut having inclined and flat faces, said inclined and flat faces forming vertical recesses at their conjunction, said vertical faces adapted to hold the nut against rotation in one direction when in contact with the projecting tongue, said flat and inclined faces extending entirely across the face of the nut, said vertical faces being deeper at their outer edges than their inner edges.

2. A nut lock comprising a bolt, a rectangular concavo-convex spring washer, an opening formed centrally of the washer and adapted to allow the bolt to pass therethrough, a slit formed in the washer, said slit extending from the central opening in the washer to one of its edges, a projecting tongue formed on the convex surface of the washer by the outward bending of the washer adjacent one side of the slit, a nut, diagonally extending vertical shoulders formed on one face of the nut for engaging with the projection on the washer, said vertical shoulders extending entirely across the face of the nut, and being higher at their outer edges than at the inner edges, and flat and tapered faces for connecting the upper edge of one vertical shoulder with the bottom edge of the next adjacent vertical shoulder.

3. A nut lock comprising a bolt, a rectangular concavo-convex washer formed of spring material, a projection formed on the convex face of said washer, said projection extending from approximately the center of the washer to one of its edges, and being higher at the outer edge than the center, a nut having diagonal shoulders extending entirely across its face, said shoulders being higher at their outer edge than at the interior, plane surfaces meeting the bottom edge of said shoulders and tapered upwardly, and flat faces meeting the upper edge of the shoulders and the tapering surfaces, said shoulders adapted to engage the projection formed on the washer and prevent retrograde movement of the nut.

In testimony whereof, we have signed our names to this specification, in the presence of two subscribing witnesses.

ERNEST E. ELLMANN.
FRANK A. KELL.
LEONARD L. ZACHARIAS.

Witnesses:
WALTER C. STEIN,
E. M. SCHUCHARDT.